(12) United States Patent
Hollen

(10) Patent No.: US 7,149,546 B1
(45) Date of Patent: Dec. 12, 2006

(54) SUBTERRANEAN EQUIPMENT BAY

(75) Inventor: Timothy Hollen, Huntington Beach, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 472 days.

(21) Appl. No.: 10/229,978

(22) Filed: Aug. 28, 2002

(51) Int. Cl.
*H04B 1/38* (2006.01)
*H04M 1/00* (2006.01)

(52) U.S. Cl. ...................... 455/561; 361/724

(58) Field of Classification Search ........... 455/560, 455/561; 361/688, 724, 602; 405/132
See application file for complete search history.

(56) References Cited

U.S. PATENT DOCUMENTS

| | | | |
|---|---|---|---|
| 4,145,857 A * | 3/1979 | Tilsen ........................ 174/37 |
| 4,961,293 A * | 10/1990 | House et al. .................. 52/21 |
| 5,653,559 A * | 8/1997 | Stieb et al. ................. 405/303 |
| 5,801,632 A * | 9/1998 | Opal .......................... 340/585 |
| 5,999,403 A * | 12/1999 | Neustadt ..................... 361/695 |
| 6,006,944 A * | 12/1999 | Machledt ................. 220/567.1 |
| 6,179,144 B1 * | 1/2001 | Abroy et al. ................. 220/3.8 |
| 6,304,444 B1 * | 10/2001 | Combs et al. .............. 361/695 |
| 6,332,326 B1 * | 12/2001 | Shim ............................. 62/93 |
| 6,356,434 B1 * | 3/2002 | Osterman .................... 361/641 |
| 6,513,342 B1 * | 2/2003 | Flynn ......................... 62/259.2 |
| 6,657,861 B1 * | 12/2003 | Irmer ......................... 361/695 |
| 6,751,479 B1 * | 6/2004 | Knight ........................ 455/560 |
| 2003/0112964 A1 * | 6/2003 | Morgan et al. ........ 379/399.01 |

OTHER PUBLICATIONS

Flexent® OneBTS™ Base Station family for UMTS—Lucent Technologies.
Flexant® CDMA Microcell for Cellular Networks.
Alpha Technologies PWE4 Pole/ground Mount Enclosure.
Alpha Technologies Vault Enclosure, Power Supply Cabinet.
Alpha Technologies Battery Enclosure Stand Alone.
Novus XT-V Series Outdoor Power Systems.
Jensen Precast electrical vault list.
Jensen Precast 6'× 10' Pasadena ducted vault × 14' long.
Jensen Precast 8' × 9'-4" Glendale ducted vault ×14' long.
Jensen Precast 4-'× 6' 6" Ladwp ducted Vault × 84" deep.
Alpha Technologies Alphacell VRLA battery.
Grainger® AC/DC Sump Pump System.
Southern California Edison Company Underground structures P.V.C. Standpipe Vents 8" and 10".
Twist-Lock® Devices Accessories.
Hubbell® Straight Blade Devices 2 pole, 3 wire grounding.
Appleton Electric Company handy boxes OB/SB-1.
B-Line systems Type 1 Screw Cover Enclosures data sheet.
B-Line Type 1 Screw Cover Enclosures catalog No.
Unistrut™ Catalog.
Unistrut™ "Z"Shape Fittings for 1 5/8 (41 MM) Width Series Channel.
Unistrut™ Ninety degree angle fittings.
Unistrut™ Flat Plate Fittings.
Unistrut™ P4000™ & P4001 Channels.
Unistrut™ P1000® & P1001 Channels.
Grip Strut® Product plank details.
Sanyo Denki Co. Ltd. Brushless DC DYNA ACE.
Sanyo Denki Co. Ltd. Sensor Specification.
Sanyo Denki Co. Ltd. Customizations & Options.
Grainger® HVAC Line Voltage Thermostats.
Jensen Pre-Cast vault.

* cited by examiner

*Primary Examiner*—Nguyen T. Vo

(57) ABSTRACT

A subterranean equipment bay for housing telecommunications equipment comprising a vault having a floor, sidewalls, and a top cover, and having a shallow depth. The vault further includes means for ventilating the vault and means for removing water from the vault.

56 Claims, 8 Drawing Sheets

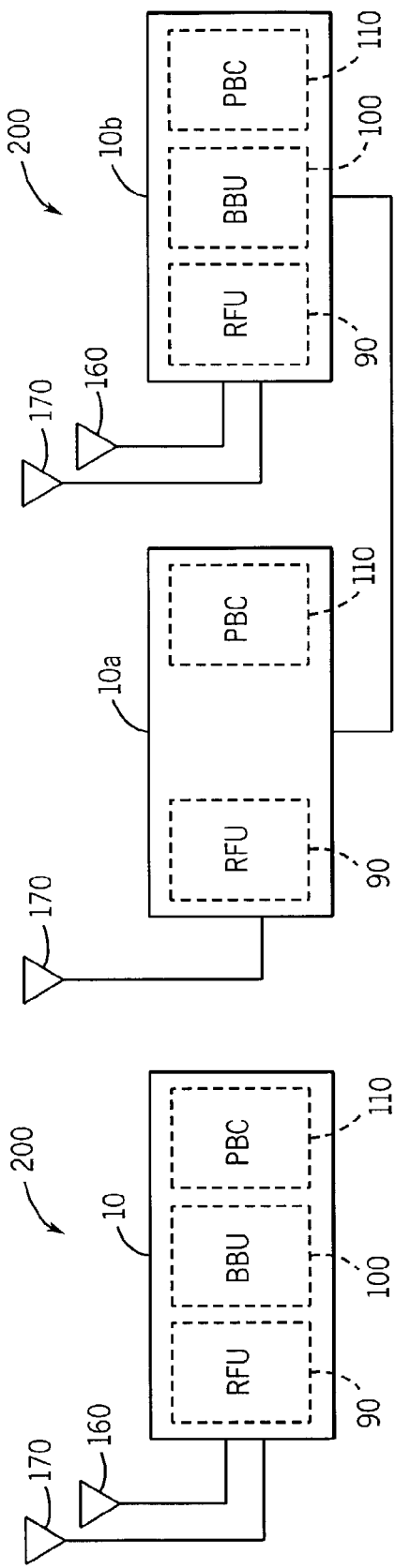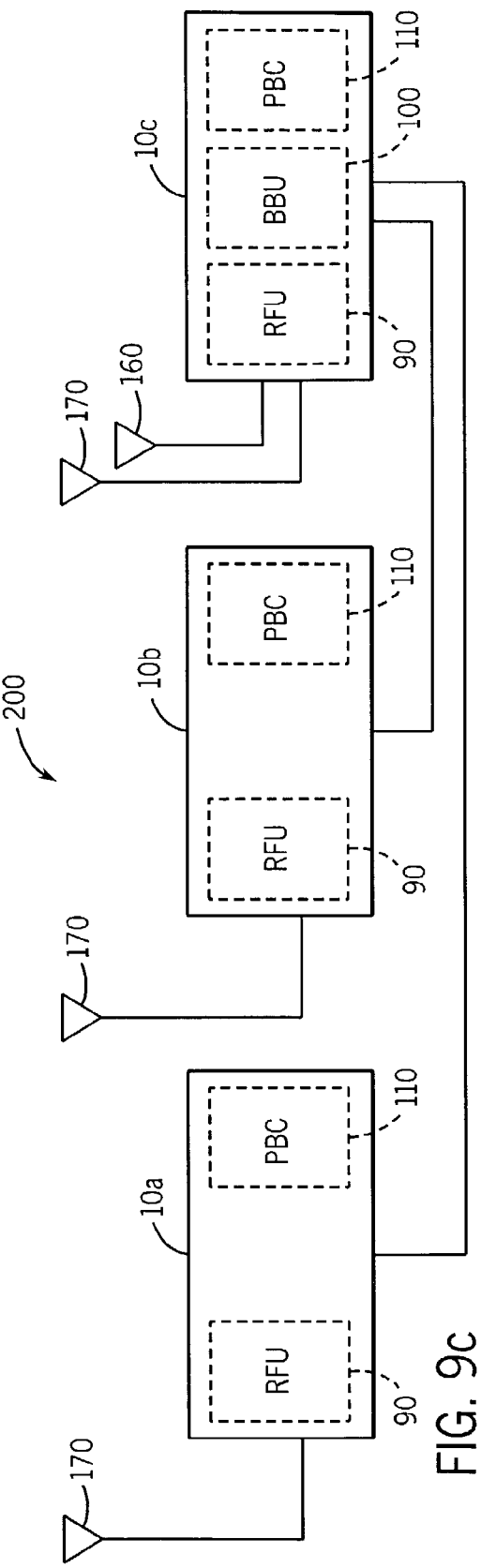

SUBTERRANEAN EQUIPMENT BAY

BACKGROUND OF INVENTION

1. Field of Invention

The present invention is directed to a telecommunications equipment bay, and more particularly to a subterranean equipment bay suitable for housing telecommunications equipment.

2. Background of the Invention

To support a nationwide network for wireless communication, a series of base stations or cells housing telecommunications equipment are positioned across the country. A cell may be located in or near population centers to provide service to the local population. A typical base station may include CDMA Distributed Base Station Equipment consisting of a Radio Frequency Unit (RFU), a Base Band Unit (BBU), as well as a Power Backup Cabinet (PBC), and is well suited for covering urban and rural trouble spots, office parks, tunnels, subways, and malls. The equipment is normally located above-ground, often positioned on utility poles, and the equipment components are designed to be installed in a vertical upright position to allow for proper operation and ventilation.

Recently, an increasing number of communities and municipalities have demanded that telecommunications equipment be installed to leave a less visual impact on the areas in which they are installed. Some communities have even imposed zoning restraints and ordinances barring the positioning of telecommunication equipment aboveground. As a result, it has become desirable, and in some cases necessary, to house telecommunications equipment underground. Housing the telecommunications equipment underground presents many challenges. An underground vault may be used to house and protect the equipment. An underground vault must be properly ventilated, and must be able to cope with water infiltration and possible flooding. In addition, a vault would need to have a depth of eight feet or more to accommodate the telecommunications equipment components in their normal vertical, upright position. To position such a vault underground would require that a hole be excavated that is eight feet deep or more. Excavating such a deep hole presents further hazards. For example, an excavator may encounter underground electrical wires, telephone lines, water lines, or sewer lines. Despite best efforts to determine the location of these potential hazards, their location is often uncharted or imprecise. Severing one of these wires or lines may create hazardous conditions, as well as require the vault to be moved to a different location. This may result in undesirable delays and increased installation costs. Moreover, deep excavations often require shoring of the sidewalls to prevent collapse during vault installation, adding further complexities and costs.

Accordingly, there is a need to provide a subterranean vault adapted for housing telecommunications equipment that does not require deep excavation, and that allows for proper ventilation of the telecommunications equipment. In addition, there is a need to provide a subterranean vault having adequate water drainage capabilities.

SUMMARY OF THE INVENTION

The present invention is specifically directed to a subterranean equipment bay useful for housing telecommunications equipment. In an embodiment, the equipment bay is a vault of a shallow depth to reduce problems associated with deep excavation. The equipment bay helps to reduce the visual impact of the aboveground placement of telecommunication equipment components. In addition, the equipment bay may be adapted to house the telecommunication equipment components in an orientation other than the normal, vertical upright position, and is equipped with a ventilation system adequate to ventilate telecommunications equipment components within the bay. The equipment bay may further be equipped with a water drainage system adequate to sufficiently drain excess water infiltration from accumulating within the equipment bay. The equipment bay may be further equipped with means for mounting the telecommunications equipment elevated from the floor of the bay.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIGS. 9a–c are a schematic drawings showing various design options for a CDMA distributed base station.

Figure 1:
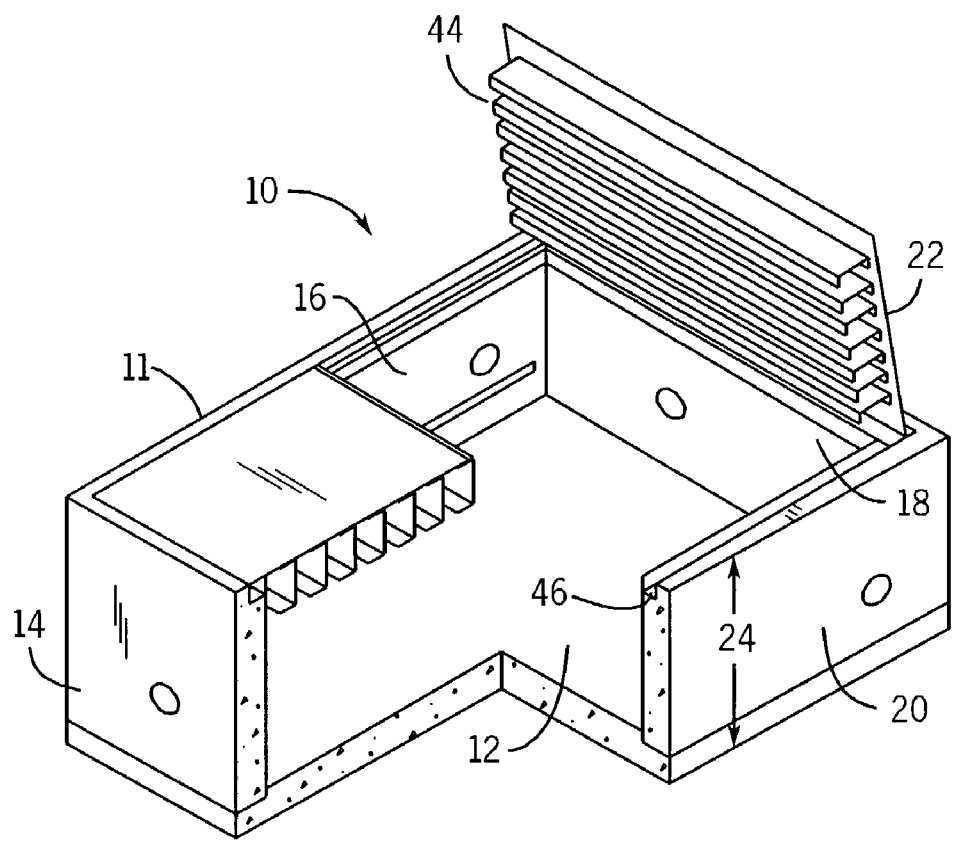
FIG. 1 is a partially cut away perspective view of a subterranean equipment bay.

While the invention is susceptible to various modifications and alternative forms, specific embodiments thereof are shown by way of example in the drawings and will herein be described in detail. It should be specifically understood with respect to the drawings, that the drawings are of preferred embodiments, and there are many other embodiments and forms in which the present invention may appear. It should also be understood that the drawings and detailed description thereof are not intended to limit the invention to the particular form disclosed, but on the contrary, the invention is to cover all modifications, equivalents and alternatives falling within the spirit and scope of the present invention or within the scope of the appended claims.

DETAILED DESCRIPTION OF PREFERRED EMBODIMENTS

With reference to FIG. 1, an illustrative subterranean equipment bay 10 is shown. Equipment bay 10 is comprised of a vault 11 that includes a base 12, and a first sidewall 14, a second sidewall 16, a third sidewall 18, and a fourth sidewall 20. Sidewalls 14, 16, 18, and 20 extend upwardly from base 12. Vault 11 further includes a top cover 22 positioned opposite the base 12. Vault 11 is preferably made of concrete and is suitable for placement underground such that the top cover 22 is positioned at ground level and the rest of the vault is underground. Equipment bay 10 is preferably placed on a minimum of a six-inch deep crusher run rock base for ease of installation and even load distribution. The base 12 is preferably comprised of a six-inch thick base slab of concrete.

In order to minimize the depth of excavation required for installation of the vault 11, the vault preferably has a depth 24 that is three feet or less. With this shallow depth, the excavation required is minimized and the likelihood of encountering uncharted underground wires and lines is reduced. In addition, the need to shore up the sides of the excavation is eliminated and the effort and manpower required to excavate the site is greatly reduced resulting in time and cost savings.

Preferably the first and third sidewalls are six inches thick, whereas the second and fourth sidewalls are nine inches thick. In a preferred embodiment the vault is designed in accordance with AASHTO load factor method, using 5,500 psi compressive strength concrete and 60,000 yield strength steel reinforcement. The top cover 22 is preferably designed for an off-street location and has an H-20 load rating.

Figure 2:
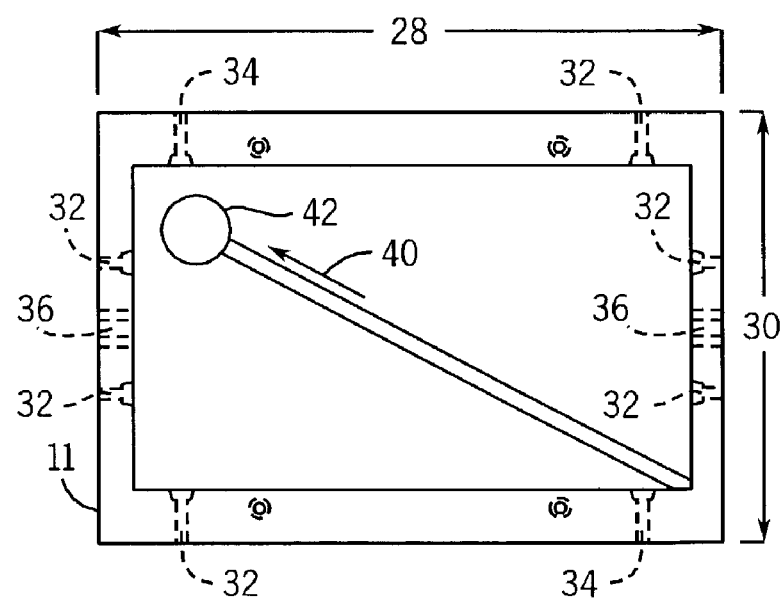
FIG. 2 is top cutaway view of the subterranean equipment bay of FIG. 1.

With reference to FIG. 2, the vault 11 preferably has an external length 28 of 9.5 feet and an external width 30 of 6.5 feet. Vault 11 also preferably includes one or more exit ports 32 in the sidewalls to allow for the routing of any necessary cabling out of the vault 11. The exit ports 32 are preferably 2 inches in diameter and equipped with seals to prevent moisture from entering the vault. For example, coaxial cabling from a radio frequency unit positioned within the vault may be routed through exit port 32. Most preferably there are a total of six exit ports 32 in the sidewalls of the vault to provide versatility in routing any necessary cabling out of the vault, depending on the orientation of the vault. In addition, the vault 11 may further include one or more threaded electrical couplings 34 in the sidewalls of the vault. Threaded electrical couplings 34 are preferably 2 inches in diameter and made of galvanized steel. Threaded electrical couplings 34 allow for wiring from a power source or telephone line to be brought into the vault 11. Vault 11 further preferably includes ground inserts 36 which are suitable to ground the equipment components placed within the vault. Preferably the ground inserts 36 are one inch diameter bronze rods that extend through the sidewalls of the vault 11. A ground ring (not shown) may be positioned to encircle the vault. In this manner, the telecommunications equipment within the vault may be safely and efficiently grounded to the ground ring.

Vault 11 also preferably includes a base 12 that is sloped along a direction 40 towards water collection area 42. Water collection area 42 is preferably comprised of a sump pit that extends below the top surface of the base 12 to collect any water that infiltrates the vault 11.

Figure 3:
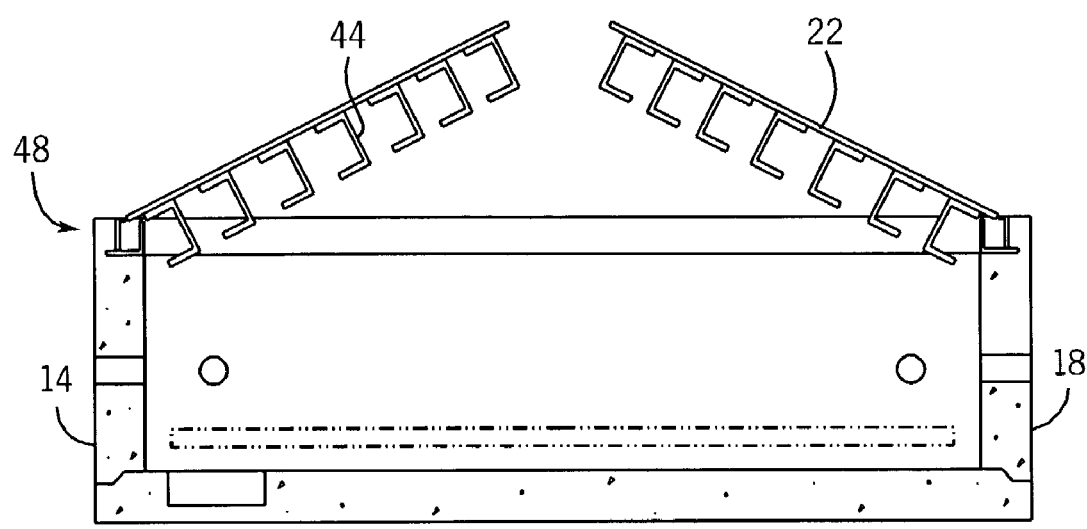
FIG. 3 is a cross-sectional side view of the subterranean equipment bay of FIG. 1.
Figure 3A:
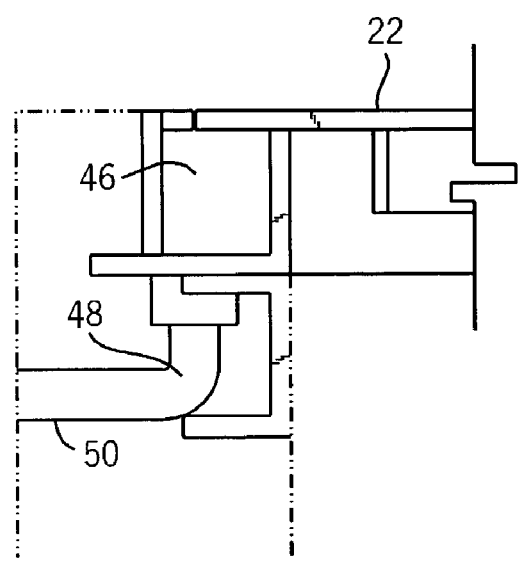
FIG. 3a is an enlarged view of a section of the subterranean equipment bay of FIG. 3 showing the details of the water drainage system.

In addition, as shown in FIGS. 1 and 3, the vault 11 may include a gutter system to direct any water away from the equipment housed within the vault. The gutter system collects water in a sidewall channel 46 positioned on top of the sidewalls 14, 16, 18, and 20. In operation, as top cover 22 is opened any water will travel over the top cover 22 and exit into top sidewall channel 46. Top sidewall channel 46 is sloped slightly to direct water towards top sidewall channel drain 48, and preferably has a depth of 4 inches. As shown in FIG. 3a, top sidewall channel drain 48 drains water from top sidewall channel 46 through drain port 50 which may be further drained to daylight or away from vault 11, as desired. The top sidewall channel drain 48 is preferably of 1.5 inches in diameter.

As shown in FIG. 3, the top cover 22 is shown as a pair of doors hingedly mounted to the top of sidewalls 14 and 18. The doors are preferably equipped with support arms to keep the doors open during repair or maintenance work on the equipment within the vault. While the top cover 22 is illustrated as two doors, the top cover 22 may take any form that provides access to the vault 11. For example, the top cover could simply be a hatchway through which personnel could enter the vault, or it could be a single door hinged to the top of one of the sidewalls, or a door hinged in the middle to allow either side of the door to be raised to allow different access points to the vault. Any number of top covers could be used to cover the vault. Top cover 22 may include channels 44 positioned on the lower surface of the top cover that are preferably at least 1.5 inches wide and 1.5 inches deep and serve to provide additional strength to the top cover. In a preferred embodiment, the top cover 22 is opened with spring assistance shown as springs 52 in FIG. 4. Preferably the spring assistance is provided by USF 60"×102" type THD aluminum spring assisted traffic frame and cover vertical spring-recessed padlock hasp through frame.

Figure 4:
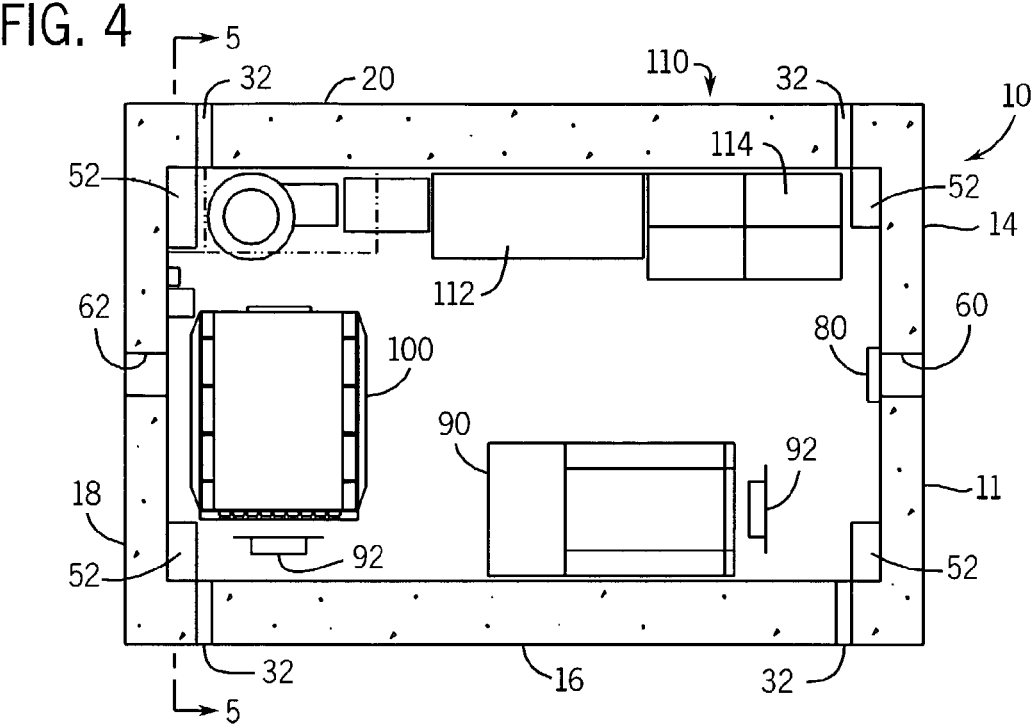
FIG. 4 is another cross-sectional top view of a subterranean equipment bay.
Figure 11:
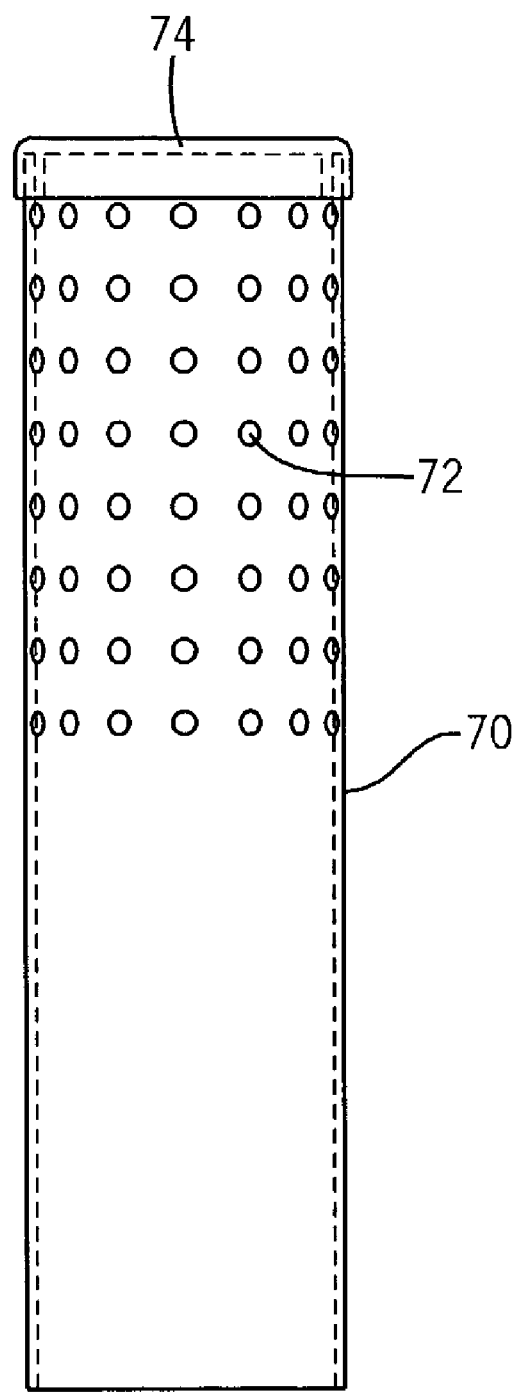
FIG. 11 is a side view of a standpipe that can be used to vent the subterranean equipment bay.

FIG. 4 shows a top cut-away view of equipment bay 10. As shown in FIG. 4, vault 11 includes an air intake port 60 shown positioned on sidewall 14. Air exhaust port 62 is positioned on opposite sidewall 16. Preferably air intake port 60 and air exhaust port 62 are ten inches in diameter and adapted for use as part of the vault's ventilation system. It will be appreciated that the air intake port 60 may be positioned in any of the sidewalls as well as the top cover 22 of the vault 11. The same is true of air exhaust port 62. Where the air intake port 60 is positioned in a sidewall, such as sidewall 14 as shown in FIG. 4, the air intake port 60 may communicate with an air intake duct that may exit aboveground. In a preferred embodiment, the air intake duct has an inner diameter of between six and ten inches, or larger. Ideally, the intake duct is ported to an aboveground standpipe that is ten inches or more in diameter such as the standpipe 70 shown in FIG. 11. The standpipe 70 shown in FIG. 11 may include a series of spaced holes 72, one inch in diameter, where the top of the standpipe is capped by cap 74. Preferably the standpipe is comprised of PVC material and is located within twenty linear feet of vault 11.

Referring back to FIG. 4, air exhaust port 62, when positioned on a sidewall, such as sidewall 18, may also communicate with an air exhaust duct that may exit aboveground. In a preferred embodiment, the air exhaust duct has an inner diameter of between six and ten inches, or larger. Ideally, the air exhaust duct is also ported to an aboveground standpipe that is ten inches or more in diameter such as the standpipe 70 shown in FIG. 11. As with the air intake standpipe, the air exhaust standpipe is preferably comprised of PVC material and is located within twenty linear feet of vault 11. In addition, the air intake and air exhaust standpipes are advantageously located near a power source pedestal or meter and/or a telephone line pedestal or meter.

As part of the ventilation system, FIG. 4 includes an air intake fan 80 associated with the air intake port 60. Air intake fan 80 draws air into the vault 60. In a preferred embodiment, the air intake fan 80 draws air into the vault at the rate of 300 or more cubic feet per minute. Active air flow through the vault prevents dust and other particles from settling within the vault and helps to provide sufficient cooling for the telecommunication equipment components positioned within the vault. Air intake fan 80 may suitably be comprised of a 48 volt variable speed fan 6 inches in diameter. One such fan is available from Sanyo Denki Co., Ltd. of Japan bearing model no. 9EB748K5H505. Any suitable fan for drawing air into the vault may be used, however.

FIG. 4 further shows various telecommunication equipment components positioned within the vault 11. Radio frequency unit 90 is shown positioned near sidewall 16. In a preferred embodiment, radio frequency unit 90 is available from Lucent Technologies' CDBS ("CDMA Distributed Base Station") product, and measures 20 inches long, 10.4 inches wide, and 34.8 inches high. Coaxial cable may be ported through the sidewalls of the vault through exit ports 32 to an externally located antenna. One or more cooling fans 92 may also be positioned adjacent radio frequency unit 90. Preferably, the cooling fan 92 is sized to provide 100 cubic feet per minute airflow over the radio frequency unit 90 to meet manufacturer specifications. Preferably, cooling fan 92 is the same as air intake fan 80 for ease of installation, maintenance, and repair. As will be noted, radio frequency unit 90 is positioned in a horizontal position to minimize the depth required for the vault 11.

Also shown within FIG. 4 is a baseband unit 100. Here, baseband unit 100 is positioned near sidewall 18. Such a baseband unit 100 is available from Lucent Technologies' CDBS product, and measures 22 inches long, 15.9 inches wide, and 30.9 inches high. Similar to the radio frequency unit 90, a pair of cooling fans 92 are positioned adjacent baseband unit 100. The cooling fans 92 are preferably sized to provide 100 cubic feet per minute airflow over the baseband unit 100 to meet manufacturer specifications, and may also be the same as air intake fan 80 for ease of installation, maintenance, and repair. Coaxial cable from the baseband unit 100 may be routed through exit ports 32 to an externally located GPS unit associated with the baseband unit 100. It will again be noted that the baseband unit 100 is positioned in a horizontal position to minimize the depth required for vault 11. Cooling fans 92 are provided to allow proper ventilation of the radio frequency unit 90 and baseband unit 100 when oriented in a horizontal position.

FIG. 4 further shows a power backup cabinet 110 comprising a rectifier 112 and batteries 114. The power backup cabinet is preferably comprised of components taken from the power backup cabinet available from Lucent Technologies' CDBS product. The power backup cabinet 110 provides a source of backup power to the radio frequency unit 90 and baseband unit 100 in the event that power from the power company is lost for any reason. Thus, the power backup cabinet is not essential, but certainly useful to prevent any interruptions in telephone service in the event there is a problem with the power supply from the power company. The radio frequency unit 90, baseband unit 100, and power backup cabinet 110 are shown in a particular orientation in FIG. 4. It will be understood that this orientation is illustrative only and that the various telecommunication equipment components could be placed in any suitable orientation or arrangement within the vault 11.

Figure 5:
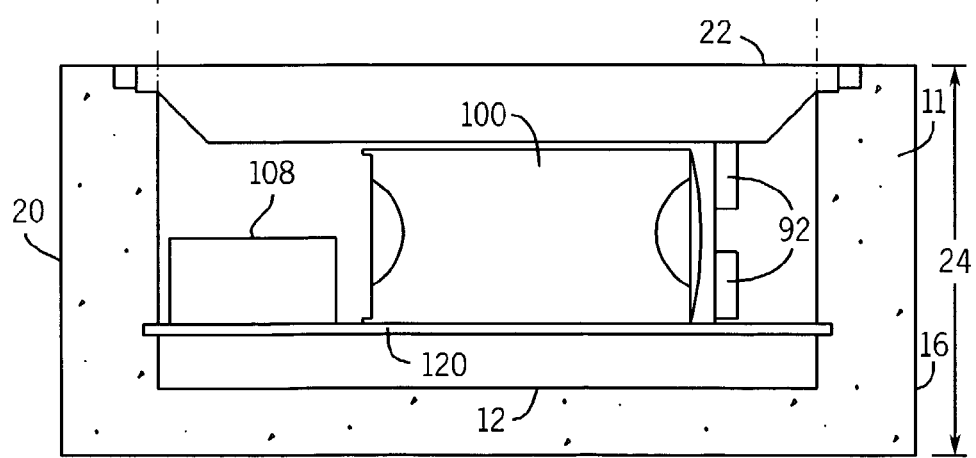
FIG. 5 is a cross-sectional side view of a subterranean equipment bay.

FIG. 5 shows a cutaway view of the vault 11. Here, a telecommunications equipment support 120 is shown positioned above the base 12. Preferably, a series of supports 120 are laid across the base 12 to allow the telecommunication equipment components to be elevated from the base 12. Elevating the equipment components prevents the equipment components from being immersed in water that may infiltrate the vault 11, and allows for some airflow underneath the components. Preferably, the equipment supports 120 elevate the telecommunications equipment components between 4 and 8 inches above the floor, although a lesser or greater elevation may be used. Most preferably, the equipment supports are comprised of model P1000 struts available from Unistrut that elevate the equipment components 6 inches above the floor. As shown in FIG. 5, in operation the equipment supports 112 elevate the batteries 108, as well as the baseband unit 100 above the base 12. As can be seen, the baseband unit 100 is placed in a horizontal orientation to minimize the depth 24 required of the vault 11. There is also minimal clearance between the telecommunications equipment components and the top cover 22 to further minimize the depth 24 required of the vault 11. Also, shown in FIG. 5 is a pair of stacked cooling fans 92 (described previously) that provide for air circulation over the baseband unit 100.

Figure 6:
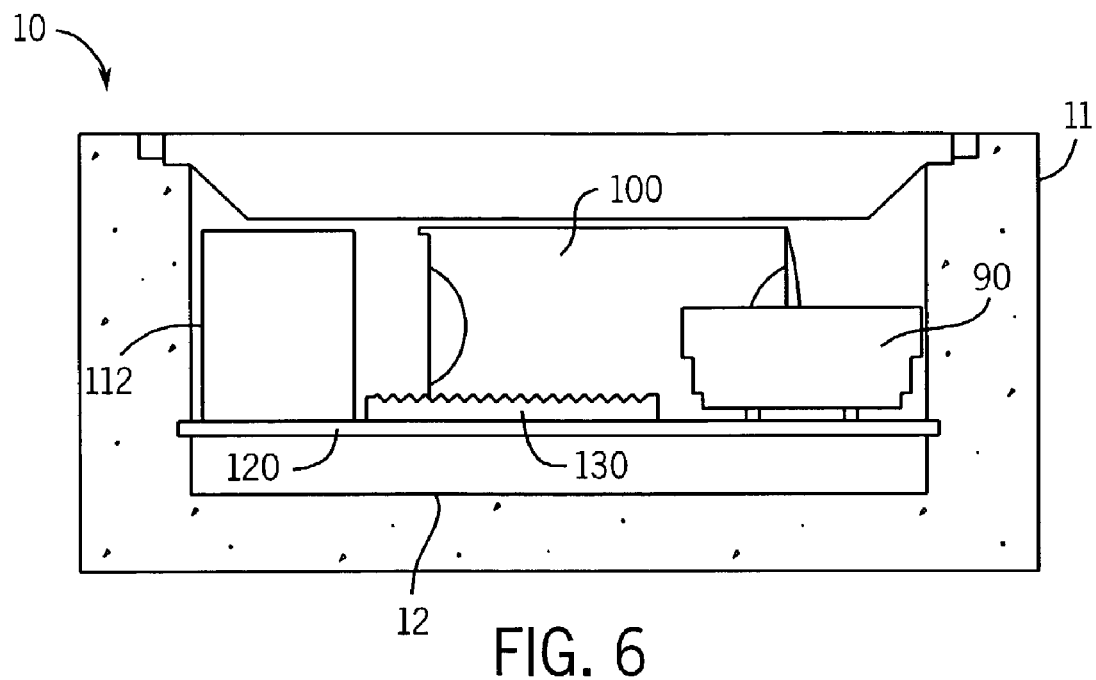
FIG. 6 is a further cross-sectional side view of the subterranean equipment bay.

FIG. 6 shows an alternate embodiment of the equipment bay 10 illustrating the different variations for the placement of the telecommunications equipment components within the vault 11. In this embodiment, rectifier 112, baseband unit 100, and radio frequency unit 90 are each positioned within the vault and elevated above base 12 by equipment supports 120. A grip plank 130 is also positioned above the telecommunication equipment supports 120 to provide sure footing for technicians and maintenance personnel when working within the vault 11. The grip plank 130 preferably provides a rough surface upon which personnel may stand while working. Most preferably, the grip plank is made of steel having 5-diamond series of holes and serrations and is two feet wide, such as the grip strut model available from Grip Strut.

Figure 7:
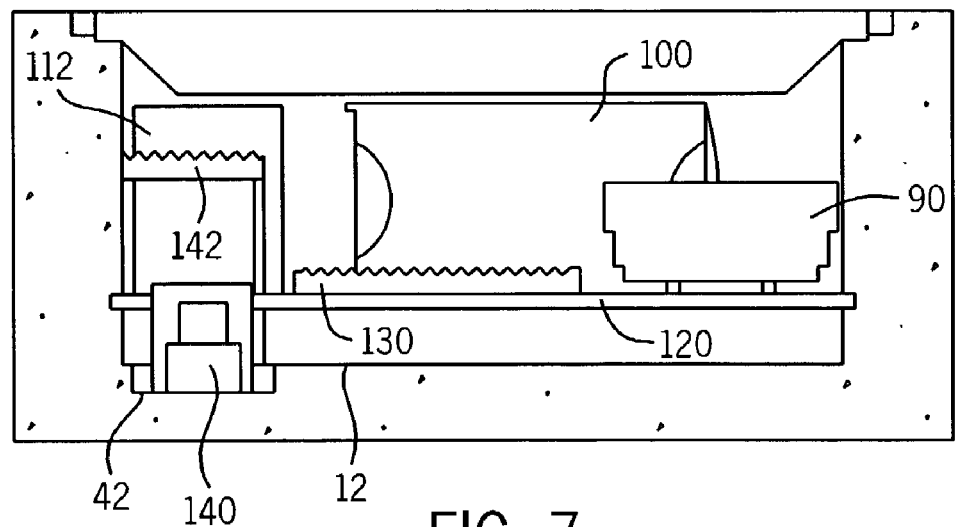
FIG. 7 is a further cross-sectional side view of the subterranean equipment bay.

FIG. 7 shows another view of an equipment bay 10. Here again, radio frequency unit 90, baseband unit 100, and rectifier 112 are elevated from the base 12 by equipment supports 120. Also shown, is water collection area 42 that collects water that infiltrates the vault. A sump pump 140 is positioned within the water collection area 42 to provide a means for removing water that infiltrates the vault from the vault. The sump pump 140 drains the water collection area 42 by means of a hose that exits the vault through any available exit port 32. Also shown in FIG. 7 is a grip step 142 that is used to provide an entry step into the vault 11 for technicians or maintenance personnel to step on to aid their movement onto the grip plank 130. The grip step 142 helps to prevent personnel from jumping down onto the grip plank 130 or grabbing the telecommunication equipment to steady themselves as they enter or exit the vault. The grip step 142 therefore provides for easier entry into the vault and helps to prevent potential damage to the equipment within the vault that may occur during entry or exit from the vault. The grip step 142 is preferably made from the same material as grip plank 130.

Figure 8:
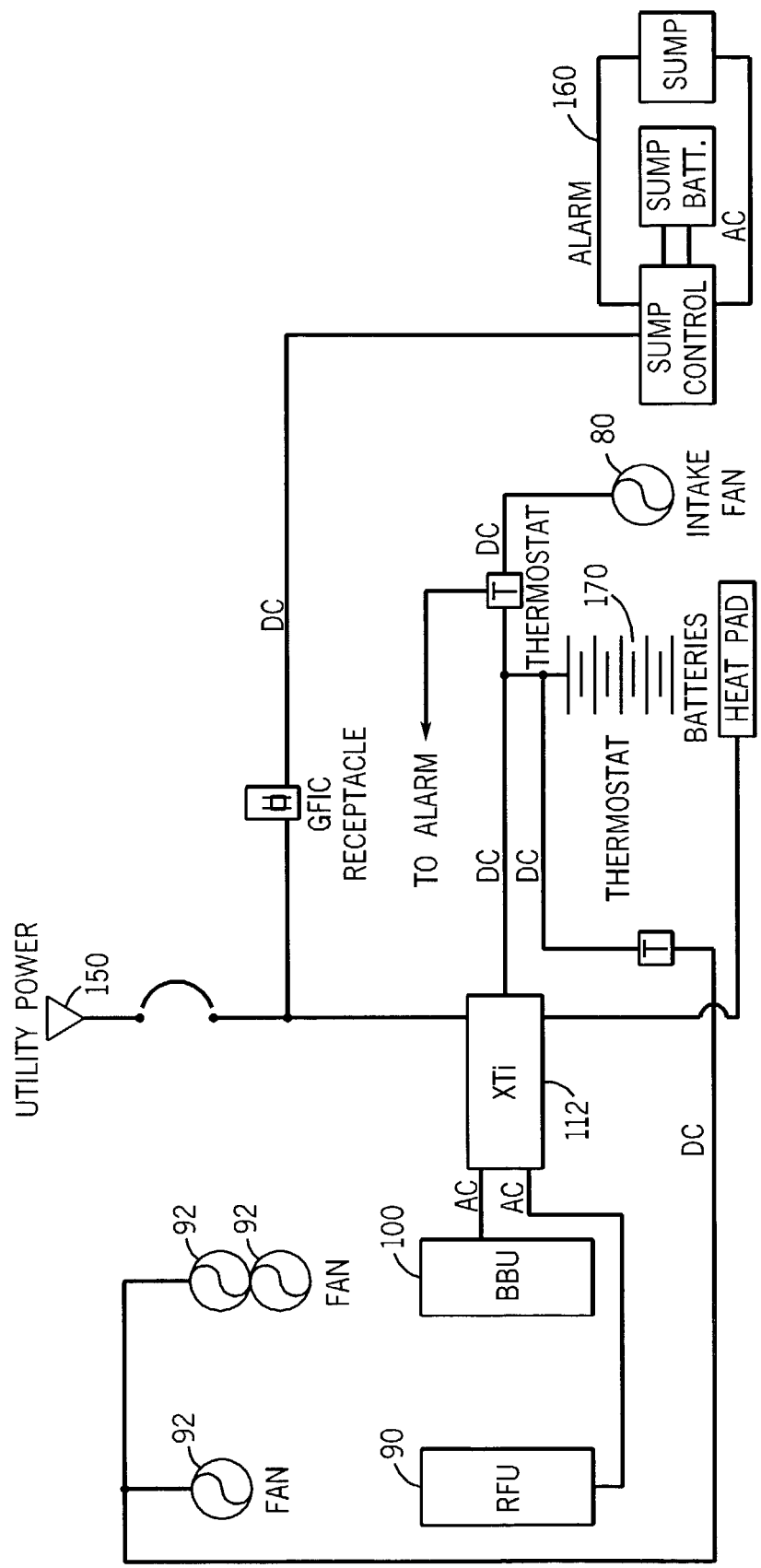
FIG. 8 is a schematic wiring diagram for a subterranean equipment bay.

FIG. 8 shows a schematic wiring diagram of equipment bay 10. In this wiring diagram, utility power 150 is used to power the water removal system 160, as well as the radio frequency unit 90, baseband unit 100, and cooling fans 92. In addition, in the event of a power outage or if power supply from utility power 150 is lost, batteries 170 operating in conjunction with rectifier 112 provide a backup source of power and may be used to power the radio frequency unit 90, baseband unit 100, and cooling fans 92.

FIGS. 9a–c show a schematic representation of various design options that can be utilized using the equipment bay 10. FIG. 9a shows equipment bay 10 with radio frequency unit 90, baseband unit 100, and power backup cabinet 110 positioned within. The baseband unit is shown connected to GPS unit 160 and the radio frequency unit 90 is shown connected to antenna 170. This arrangement comprises a wireless distributed base station 200. The communications between the base station and wireless devices may occur in a digital format, such as CDMA, TDMA, GSM, or 802.11x, or they may occur in an analog format, such as AMPS. A preferred wireless communications format is "CDMA 2000," such as described in EIA/TIA/IS-2000 Series, Rev. A (published March 2000), which is incorporated herein by reference. FIG. 9*b* shows a first equipment bay 10*a* with radio frequency unit 90 and power backup cabinet 110 positioned within, where the radio frequency unit is connected to antenna 170. A second equipment bay 10*b* has a radio frequency unit 90, baseband unit 100, and power backup cabinet 110 positioned within. The baseband unit is shown connected to GPS unit 160 and the radio frequency unit 90 is shown connected to antenna 170. The arrangement shown in FIG. 9*b* comprises an alternate wireless distributed base station 200. In this arrangement, a single baseband unit 100 can support two radio frequency units 90 positioned within separate vaults. Moreover, FIG. 9*c* shows a first equipment bay 10*a* with radio frequency unit 90 and power backup cabinet 110 positioned within, where the radio frequency unit 90 is connected to antenna 170, as well as a second equipment bay 10*b* having the same components. A third equipment bay 10*c* has a radio frequency unit 90, baseband unit 100, and power backup cabinet 110 positioned within. The baseband unit is shown connected to GPS unit 160 and the radio frequency unit 90 is shown connected to antenna 170. The arrangement shown in FIG. 9*c* comprises another alternate wireless distributed base station 200. In this arrangement, a single baseband unit 100 supports three radio frequency units 90 positioned within separate vaults.

It will be appreciated that each of the equipment bays shown in FIGS. 9*a*–*c* include a power backup cabinet which is highly desirable to provide a backup source of power in the event of a power outage or power loss. However, it is not a required feature of the wireless distributed base station, as it could simply rely on a power supply from the power company. In addition, it will also be appreciated that as shown in FIG. 9*c*, a single baseband unit 110 may support up to three separate radio frequency units 90. Thus, in a given equipment bay 10, there may only be a radio frequency unit 90 positioned therein, or conversely, an equipment bay could be provided with only a baseband unit 100 that supports radio frequency units positioned in other vaults. Thus, there is a variety of ways in which a wireless distributed base station may be formed.

Figure 10:
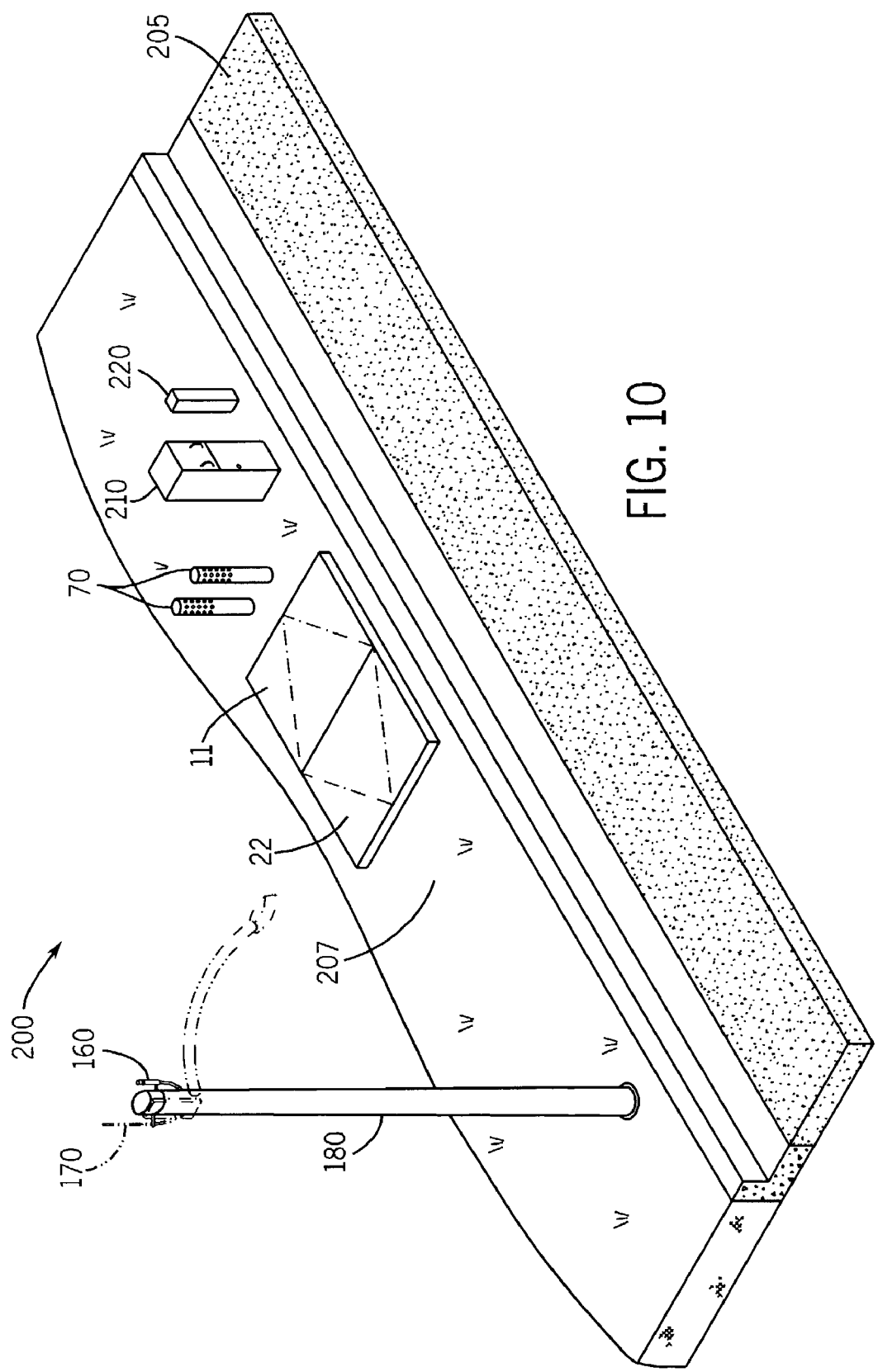
FIG. 10 is a perspective view of a wireless distributed base station.

FIG. 10 shows a wireless distributed base station 200. Vault 11 is shown placed under the ground 207 with the top cover 22 positioned at ground level. Air intake standpipe 70 and air exhaust standpipe 70 are shown positioned near to the vault 11, as well as in close proximity to power pedestal 210 and telephone pedestal 220. Also shown are antenna 170 and GPS unit 160 that may be positioned on a light post 180. In this manner, the wireless distributed base station 200 may be positioned near street 205 and create a limited visual impact on the surrounding area.

What is claimed is:

1. A subterranean equipment bay for housing telecommunication equipment components comprising:
    a vault having a base, a first sidewall, a second sidewall, a third sidewall, and a fourth sidewall, where each of the sidewalls extend upwardly from the base which is to be positioned underground in a generally horizontal position so that the base and each of the sidewalls extending upwardly from the base contact subterranean earth;
    a top cover positioned in a generally horizontal position that is above and generally coplanar with the base of the vault and providing an access into the vault;
    an intake air port positioned in one of the sidewalls or the top cover of the vault and an air exhaust port positioned in one of the sidewalls or top cover of the vault;
    an air intake fan associated with the intake air port; and
    a water collection area for collecting any water that infiltrates the vault, and wherein a top sidewall channel is positioned on the top of each of the sidewalls to channel water.

2. The equipment bay of claim 1, wherein the vault has a depth of three feet or less.

3. The equipment bay of claim 1, wherein a distance from an upper surface of the base to a bottom of the top cover is three feet or less.

4. The equipment bay of claim 3, where the distance is about 2 feet.

5. The equipment bay of claim 1, wherein the vault has external dimensions measuring about 3 feet deep, about 6.5 feet wide, and about 9.5 feet long.

6. The equipment bay of claim 1, wherein the vault has internal dimensions measuring about 2 feet in height, about 5 feet wide, and about 8 feet long.

7. The equipment bay of claim 1, wherein the water collection area comprises a sump pit.

8. The equipment bay of claim 7, wherein the water collection area further includes a sump pump for draining any collected water from the sump pit.

9. The equipment bay of claim 1, wherein the base of the vault is sloped towards the water collection area.

10. The equipment bay of claim 1, wherein the sidewalls are between 6 and 9 inches thick.

11. The equipment bay of claim 1, wherein the base and sidewalls are comprised of precast concrete.

12. The equipment bay of claim 1, wherein the top cover includes a door providing access into the vault to a technician.

13. The equipment bay of claim 12, wherein the door is hingedly mounted to one of the sidewalls.

14. The equipment bay of claim 1, wherein the top cover includes a first door hingedly attached to the first sidewall and a second door hingedly attached to the sidewall opposite the first sidewall, said first and second doors providing access into the vault for a technician.

15. The equipment bay of claim 1, wherein the top cover includes a plurality of top cover channels located on a lower surface of the top cover to provide additional strength to the top cover.

16. The equipment bay of claim 1, further including a top sidewall channel drain that drains water from the top sidewall channel through a drain hole in the bottom of the sidewall channel.

17. The equipment bay of claim 1, wherein the air intake port is positioned on one of the sidewalls and communicates with an air intake duct that is vented aboveground.

18. The equipment bay of claim 17, wherein the air intake duct is vented to a standpipe.

19. The equipment bay of claim 18, wherein the standpipe is capped and has a series of radial throughholes to permit air to pass through the air intake duct to the air intake port.

20. The equipment bay of claim 1, wherein the air exhaust port is positioned on one of the sidewalls and communicates with an air exhaust duct that is vented aboveground.

21. The equipment bay of claim 19, wherein the exhaust duct is vented to a standpipe located aboveground and has a series of radial throughholes to permit air to pass from the air exhaust port through the air exhaust duct.

22. The equipment bay of claim 21, wherein the standpipe is capped and has a series of radial throughholes to permit air to pass from the air exhaust port through the air exhaust duct.

23. The equipment bay of claim 1, further including one or more telecommunication equipment supports positioned above the bottom floor adapted to elevate telecommunication equipment components above the floor.

24. The equipment bay of claim 23, further including a radio frequency unit positioned on the one or more telecommunication equipment supports.

25. The equipment bay of claim 24, wherein the radio frequency unit is positioned on its side in a horizontal position.

26. The equipment bay of claim 25, further including one or more fans positioned to provide air circulation across the radio frequency unit.

27. The equipment bay of claim 23, further including a baseband unit positioned on the one or more telecommunication equipment supports.

28. The equipment bay of claim 27, wherein the baseband unit is positioned on its side in horizontal position.

29. The equipment bay of claim 28, further including one or more fans positioned to provide air circulation across the baseband unit.

30. The equipment bay of claim 23, further including a grip plank positioned above the equipment supports.

31. The equipment bay of claim 30, further including a grip step positioned above the grip plank to facilitate entry and exit from the vault.

32. The equipment bay of claim 1, wherein the air circulation within the vault is 300 cubic feet per minute or more.

33. The equipment bay of claim 1, wherein the air exhaust is 65 cubic feet per minute or more.

34. The equipment bay of claim 1, further including one or more power line inlet ports positioned within one of the sidewalls to allow the routing of a power line into the equipment bay.

35. The equipment bay of claim 1, further including one or more exit ports to allow cabling from telecommunication equipment components to exit the vault.

36. The equipment bay of claim 1, where the one or more telecommunication equipment supports are positioned to elevate the telecommunication equipment components to between four and eight inches above the base.

37. The equipment bay of claim 1, wherein the distance between a top surface of the base and a bottom surface of the top cover is three feet or less.

38. The equipment bay of claim 37, where the distance is about 2 feet.

39. The equipment bay of claim 38, wherein the vault has internal dimensions measuring about 5 feet wide, and about 8 feet long.

40. A subterranean equipment bay for housing telecommunication equipment components comprising:
a vault having a floor, a first sidewall, a second sidewall, a third sidewall, and a fourth sidewall, where each of the sidewalls extend upwardly from the floor which is to be positioned underground in a generally horizontal position so that the floor and each of the sidewalls extending upwardly from the floor contact subterranean earth;
a top cover positioned in a generally horizontal position that is above and generally coplanar with the floor of the vault and providing an access into the vault;
means for ventilating the vault; and
means for removing water that infiltrates the vault from the vault and wherein a top sidewall channel is positioned on the top of each of the sidewalls to channel water.

41. The equipment bay of claim 40, further including means for elevating telecommunication equipment components no more than eight inches above the bottom floor.

42. The equipment bay of claim 41, further including a radio frequency unit positioned above the bottom floor in a horizontal position.

43. The equipment bay of claim 42, further including a baseband unit positioned above the bottom floor in a horizontal position.

44. The equipment bay of claim 42, further including a rectifier positioned above the bottom floor in a horizontal position.

45. The equipment bay of claim 42, further including means for circulating air over the radio frequency unit.

46. The equipment bay of claim 45, further wherein ventilation across the radio frequency unit is 100 cubic feet per minute or more.

47. The equipment bay of claim 40, wherein the means for ventilating provides circulation of 300 cubic feet per minute within the vault.

48. A wireless distributed base station comprising:
a subterranean vault having a floor, a first sidewall, a second sidewall, a third sidewall, and a fourth sidewall, where each of the sidewalls extend upwardly from the floor which is to be positioned underground in a generally horizontal position so that the floor and each of the sidewalls extending upwardly from the floor contact subterranean earth;
a top cover positioned in a generally horizontal position that is above and generally coplanar with the floor of the vault and providing an access into the vault positioned opposite the floor;
means for ventilating the vault;
means for removing water that infiltrates the vault from the vault;
one or more telecommunication equipment supports positioned above the floor;
a radio frequency unit positioned within the vault on at least one of the supports in a horizontal orientation;
an antenna positioned nearby the vault for association with the radio frequency unit, and wherein a top sidewall channel is positioned on the top of each of the sidewalls to channel water.

49. The wireless base station of claim 48, further including a power supply line port in one of the sidewalls allowing the radio frequency unit to be electrically connected to a power source.

50. The wireless base station of claim 48, further including one or more exit ports positioned in one or more of the sidewalls to allow cabling to exit the vault.

51. The wireless base station of claim 48, further including a rectifier positioned within the vault on at least one of the supports.

52. The wireless base station of claim 48, further including a baseband unit positioned within the vault on at least one of the supports in a horizontal orientation.

53. The wireless base station of claim 48, wherein the vault has a depth of three feet or less.

54. The wireless base station of claim 53, wherein the vault has width of about 5 feet and a length of about 8 feet.

55. The wireless base station of claim 53, wherein the vault has an internal height of between two to four feet.

56. The wireless base station of claim 55, wherein the internal height is about two feet.

* * * * *